United States Patent Office 3,082,011
Patented Mar. 19, 1963

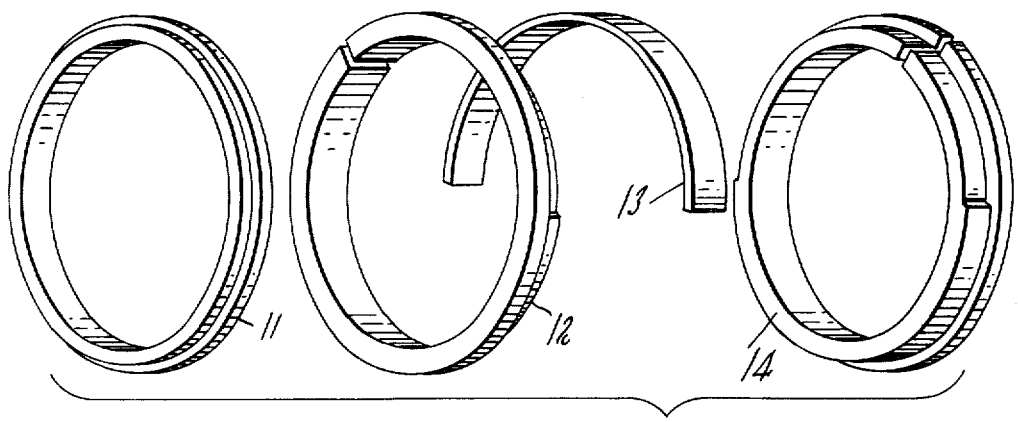
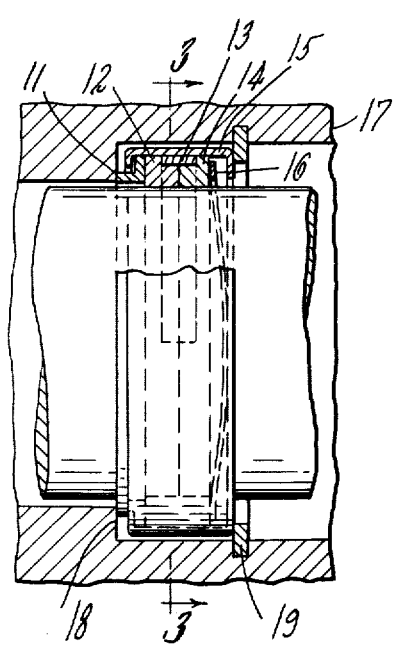
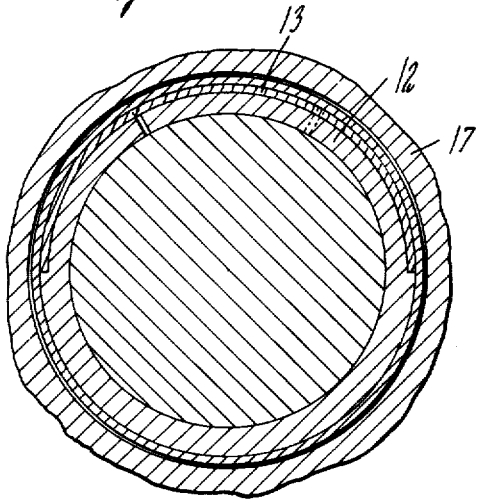

3,082,011
ROTARY SHAFT SEAL
Rolf H. W. Kroekel, West Greenwich, R.I., assignor to Sealol Corp., Providence, R.I., a corporation of Rhode Island
Filed Dec. 9, 1959, Ser. No. 858,545
5 Claims. (Cl. 277—26)

This invention relates generally to devices for sealing relatively rotating surfaces against axial fluid leakage, and in particular it is concerned with rotary shaft seals.

It is the object of the invention to provide a shaft seal of improved construction which is better adapted to accommodate growth of the shaft resulting from an increase in its temperature, thus minimizing wear and prolonging the life of the seal.

The novel features of the invention together with further objects and advantages will become apparent from the following detailed description and the drawing to which it refers.

In the drawing:

FIG. 1 is an exploded view of certain parts of the shaft seal according to the present invention;

FIG. 2 is a sectional view taken diametrically through the seal assembly; and

FIG. 3 is a sectional view taken on line 3—3 of FIG. 2.

With reference to the drawing, and more particularly to FIG. 1, it will be observed that the seal assembly of the present invention comprises a full circle ring 11, a split sealing ring 12, an elongated expansion strip 13 having an arcuate configuration, and another split sealing ring 14. But for the location of the split in the sealing ring 14 which is circumferentially spaced from the split in the sealing ring 12, one of these rings may be regarded as the image of the other. That is to say, each has a circumferentially directed recess in an arcuate portion of its outer surface, such that when the sealing rings are placed side by side in face-to-face contact, these recesses are adapted to define a circumferentially directed arcuate channel. Preferably the sealing rings are made from a low friction material such as mechanical carbon, graphite, nitrides, sulfides, and so forth. This does not exclude the possibility of using such materials as metals, ceramics, cermets, and plastics, among others, for the sealing rings, however.

As shown, the splits in the sealing rings extend in a generally radial direction and, preferably, they are formed by cracking. The bore and outer form on the sealing rings are then machined with the rings slightly expanded.

Preferably the expansion strip is formed with a metal having a relatively high coefficient of expansion consistent with other factors arising out of the particular use to which this sealing assembly is put, namely factors such as corrosion resistance, strength, melting point and so forth. The composition of the full circle ring is not so critical and it may be made of steel, for example.

With reference now to FIG. 2 it will be observed that the expansion strip 13 is retained in the channel defined by the sealing rings. Disposed concentrically about the expansion strip and the sealing rings is a shroud ring 15 having inwardly turned flanges. A wave spring 16 which is located between one of these flanges and the sealing rings, presses against the latter which, in turn, press against the full circle ring 11. As shown, the full circle ring has a portion which bears against a housing. By way of example, the housing for the assembly may comprise a bored member 17 having a shoulder 18 in contact with the full circle ring and a keyway for a snap ring 19. The seal assembly proper is snugly fitted between the shoulder and the snap ring as shown.

In operation, an increase in temperature causes the expansion strip to expand more than the sealing ring, the shroud ring, or the shaft itself because of the relatively high coefficient of expansion of the material comprising the strip. Deformation of the expansion strip in the radial direction, however, is resisted by the shroud ring. Instead, the shroud ring which is closely fitted to the strip constrains the latter to expand primarily in the direction of its longitudinal axis so that its ends press against the steps or ledges defining the ends of the recesses in the sealing rings. This forces apart the splits in the sealing rings, effectively increasing their diameter to accommodate the increase in diameter or growth of the shaft resulting from the increase in temperature. Since the shroud ring will ordinarily be made from the same material as the shaft, it will expand at the same rate, generally much greater than that of the sealing rings, so as to make room for the spreading of the sealing rings by the expansion strip. By proper choice of the length of the expansion strip, taken in connection with its coefficient of expansion, the effective growth rate of the seal can be closely matched to that of the shaft so that wear on the seal, which of course is synonymous with leakage, can be kept to a minimum.

When the shaft is cold, the splits in the sealing rings may be adapted to assume a slightly open position or be closed altogether. In the first case, there will be minute leakage through the gap where it meets the shaft. In the second case with the gap closed, such minute leakage will be distributed around the shaft. Factors to consider in the selection of a line of contact type of seal or an annular clearance type are the characteristics of the medium to be sealed, its pressure, the amount of leakage that can be tolerated, and so forth. This is well known to those skilled in the art and will not be expanded upon here since it is entirely optional as regards the principles of the invention, which design approach is followed. It is preferred, however, that when the shaft is cold, a small amount of play or clearance exists between the ends of the expansion strip and the steps in the ring. This allows for a fast "run-in" whereby the seal is conformed to the exact shaft diameter before the spreading action of the splits begins to take place.

Although the invention has been described in terms of a single embodiment, it will be appreciated by those skilled in the art that various other embodiments within the spirit and scope of the invention are possible. Therefore, the invention should not be deemed to be limited to the details of what has been described herein by way of illustration, but rather it is to be deemed to be limited only by the scope of the appended claims.

What is claimed is:

1. A sealing ring assembly comprising at least one seal ring having only one split extending in a generally radial direction, an elongated expansion strip having an arcuate configuration, said seal ring being provided with circumferentially spaced steps less than 180° apart, and said expansion strip having its ends bearing against said steps, a shroud ring disposed concentrically about said seal ring and said expansion strip, the inner circumferential wall of said shroud ring being closely fitted to said seal ring and said expansion strip and having a lower coefficient of expansion than said expansion strip to constrain the latter to expand as the temperature rises in the direction of its longitudinal axis and to spread apart the split in said seal ring, and means to cover a face of said seal ring so as to prevent leakage through the split.

2. A sealing ring assembly comprising at least one seal ring having only one split extending in a generally radial direction, an elongated expansion strip having an arcuate configuration, said sealing ring having a circumferentially directed recess less than 180° in length in an arcuate portion of its outer surface, and said expansion strip being disposed in said recess, a shroud ring disposed concentrically about said seal ring and said expansion strip, the inner circumferential wall of said shroud ring being closely fitted to said seal ring and said expansion strip and having a lower coefficient of expansion than said expansion strip to constrain the latter to expand so the temperature rises in the direction of its longitudinal axis and to spread apart the split in said seal ring, and means to cover a face of said seal ring so as to prevent leakage through the split.

3. A sealing ring assembly for use in a housing comprising at least one seal ring having only one split extending in a generally radial direction, an elongated expansion strip having an arcuate configuration, said seal ring having a circumferentially directed recess less than 180° in length in an arcuate portion of its outer surface and said expansion strip being disposed in said recess, a shroud ring disposed concentrically about said seal ring and said expansion strip, said shroud ring having inwardly turned flange portions and an inner circumferential wall closely fitted to said seal ring and said expansion strip and having a lower coefficient of expansion than said expansion strip to constrain the latter to expand as the temperature rises in the direction of its longitudinal axis, a full circle ring to cover the split in said seal ring so as to prevent leakage therethrough in an axial direction, and a wave spring retained between one of said flanges on said shroud ring and said seal ring to press said seal ring against said full circle ring and said full circle ring against the housing.

4. A sealing ring assembly comprising a pair of seal rings disposed in face-to-face contact, said seal rings each having only one split extending in a generally radial direction, said splits being spaced from one another circumferentially of said rings, an elongated expansion strip having an arcuate configuration, said seal rings having circumferentially directed recesses less than 180° in length in corresponding arcuate portions of their outer surfaces to form a composite channel extending across said splits, said expansion strip being disposed in said channel, and a shroud ring disposed concentrically about said seal ring and said expansion strip, the inner circumferential wall of said shroud ring being closely fitted to said seal rings and said expansion strip and having a lower coefficient of expansion than said expansion strip to constrain the latter to expand as the temperature rises in the direction of its longitudinal axis and to spread apart the splits in said seal rings.

5. A sealing ring assembly for use in a housing comprising a pair of seal rings disposed in face-to-face contact, said seal rings each having only one split extending in a generally radial direction, said splits being spaced from one another circumferentially of said seal rings, an elongated expansion strip having an arcuate configuration, said seal rings having circumferentially directed recesses less than 180° in length in corresponding arcuate portions of their outer surfaces to form a composite channel extending across said splits, said expansion strip being disposed in said channel, a shroud ring disposed concentrically about said seal rings and said expansion strip, said shroud ring having inwardly turned flange portions and an inner circumferential wall closely fitted to said seal rings and said expansion strip and having a lower coefficient of expansion than said expansion strip to constrain the latter to expand as the temperature rises in the direction of its longitudinal axis and to spread apart the splits in said seal rings, a full circle ring disposed adjacent one of said seal rings to cover the split therein, and a wave spring retained between one of the flanges on said shroud ring and one of said seal rings to press said seal rings against said full circle ring and said full circle ring against the housing.

References Cited in the file of this patent

UNITED STATES PATENTS

| | | |
|---|---|---|
| 100,213 | Thayer et al. | Feb. 22, 1870 |
| 1,033,237 | De Ferranti | July 23, 1912 |
| 1,481,167 | White | Jan. 15, 1924 |
| 2,937,039 | Santapa | May 17, 1960 |

UNITED STATES PATENT OFFICE
CERTIFICATE OF CORRECTION

Patent No. 3,082,011                          March 19, 1963

Rolf H. W. Kroekel

It is hereby certified that error appears in the above numbered patent requiring correction and that the said Letters Patent should read as corrected below.

Column 3, line 10, for "so" read -- as --.

Signed and sealed this 8th day of October 1963.

(SEAL)
Attest:

ERNEST W. SWIDER
Attesting Officer

EDWIN L. REYNOLDS
Acting Commissioner of Patents